(12) United States Patent
Perrizo

(10) Patent No.: US 7,640,219 B2
(45) Date of Patent: Dec. 29, 2009

(54) PARAMETER OPTIMIZED NEAREST NEIGHBOR VOTE AND BOUNDARY BASED CLASSIFICATION

(75) Inventor: William K. Perrizo, Fargo, ND (US)

(73) Assignee: NDSU - Research Foundation, Fargo, ND (US)

( * ) Notice: Subject to any disclaimer, the term of this patent is extended or adjusted under 35 U.S.C. 154(b) by 97 days.

(21) Appl. No.: 11/890,796

(22) Filed: Aug. 6, 2007

(65) Prior Publication Data

US 2008/0040302 A1 Feb. 14, 2008

Related U.S. Application Data

(60) Provisional application No. 60/835,553, filed on Aug. 4, 2006.

(51) Int. Cl.
G06N 5/00 (2006.01)
(52) U.S. Cl. .............................. 706/20; 706/15; 706/45
(58) Field of Classification Search ................... 706/45, 706/46, 12, 15
See application file for complete search history.

(56) References Cited

U.S. PATENT DOCUMENTS

| | | | | |
|---|---|---|---|---|
| 6,952,499 | B1 * | 10/2005 | Vititoe | 382/224 |
| 2005/0163384 | A1 * | 7/2005 | Avni et al. | 382/218 |
| 2005/0171700 | A1 * | 8/2005 | Dean | 702/16 |
| 2008/0281764 | A1 * | 11/2008 | Baxter | 706/12 |
| 2008/0312513 | A1 * | 12/2008 | Simon et al. | 600/300 |

OTHER PUBLICATIONS

Perrizo, et al, Parameter Optimized, Vertical, Nearest-Neighbor-Vote and Boundary-Based Classification, Dec. 2006, Fargo, North Dakota, ACM SIGKDD Explorations Newsletter, vol. 8, issue 2, pp. 63-69.*
Duch, Neural Minimal Distance Methods, World Congress of Computational Intelligence, May 1998, Anchorage, Alaska, IJCNN'98 Proceedings, pp. 1299-1304.*
Abidin, et al, Smart-TV: A Fast and Scalable Nearest Neighbor Based Classifier for Data Mining, Proceedings of the 2006 ACM symposium on Applied computing, 2006, pp. 536-540.*
Gunn., "*Support Vector Machines for Classification and Regression*", University of Southhampton, Faculty of Engineering, Science and Mathematics School of Electronics and Computer Science., May 10, 1998. 54 pages.
Lebanon et al, "*Hyperplane Margin Classifiers on the Multinomial Manifold*", Appearing in Proceedings of the 21$^{st}$ International Conference on Machine Learning, Banff, Canada 2004.

* cited by examiner

*Primary Examiner*—Wilbert L Starks, Jr.
(74) *Attorney, Agent, or Firm*—Patterson, Thuente, Skaar & Christensen, PA

(57) ABSTRACT

Systems and methods of classifying a subject data item based on a training set of pre-classified data items. A piecewise-linear approximation of a local boundary between different classes of data items is automatically computed. The local boundary is approximated by a neighborhood set of data items selected from the training set that have been pre-classified into different classes and have points similar to a point of the subject data item. A class is automatically assigned to the subject data item in accordance with a side of the local boundary on which the subject data item resides.

30 Claims, 13 Drawing Sheets

PARAMETER OPTIMIZED NEAREST NEIGHBOR VOTE AND BOUNDARY BASED CLASSIFICATION

CROSS-REFERENCE TO RELATED APPLICATION

This Application claims the benefit of U.S. Provisional Application No. 60/835,553, filed Aug. 4, 2006, and entitled "PARAMETER OPTIMIZED NEAREST NEIGHBOR VOTE AND BOUNDARY BASED CLASSIFICATION," which is incorporated by reference herein in its entirety.

FIELD OF THE INVENTION

The present invention relates generally to computer-assisted data analysis and, more particularly, to data mining classification.

BACKGROUND OF THE INVENTION

Data mining is the use of automated data analysis techniques to uncover previously undetected or non-preselected relationships among data items. Examples of data mining applications can be found in diverse areas such as database marketing, financial investment, image analysis, medical diagnosis, production manufacturing forensics, security, defense, and various fields of research.

Computer Aided Detection (CAD) applications are very interesting data mining problems in medical applications. The ultimate goal in a CAD system is to be able to identify the sick patients by analyzing a measurement data set and using the available descriptive features. CAD application present a number of challenges. For instance, typical CAD training data sets are large and extremely unbalanced between positive and negative classes of data items (positive classes of data items being associated with disease states, for example). When searching for descriptive features that can characterize the medical conditions of interest, system developers often deploy a large feature set, which may introduce irrelevant and redundant features. Labeling is often noisy as labels may be created without corresponding biopsies or other independent confirmations. In the absence of CAD decision support, labeling made by humans typically relies on a relatively small number of features, naturally due to limitations in the number of independent features that can be reasonably integrated by human decision makers. In order to achieve clinical acceptance, CAD systems have to meet extremely high performance thresholds to provide value to physicians in their day-to-day practice.

Nearest Neighbor Vote classification and Full Decision Boundary Based (e.g., Support Vector Machine) classification are popular approaches to real life data classification applications. In Nearest Neighbor Vote classification, the neighbors (i.e. the data items in the training set that are sufficiently similar or close to the data item to be classified), are found by scanning the entire data set. The predominant class in that neighbor set is assigned to the subject. U.S. Pat. No. 6,941,303 to Perrizo, incorporated herein by reference in its entirety, describes a Nearest Neighbor Vote classification technique that is a variant of the well-known K-Nearest Neighbor (KNN) classification approach. KNN methods are desirable methods since no residual model "classifier" needs to be built ahead of time (e.g., during a training phase). Models involve approximations and summarizations and therefore are prone to being less accurate.

However, Nearest Neighbor Vote methods have limitations also in being able to properly classify data items in data sets where there is a great disparity in the sizes of the different classes and where there is a very large training data set. When the class sizes are vastly different, the voting can be weighted by class size, but still, the subset of nearest neighbors can, for instance, have no data items the small classes and therefore give the wrong result. The result of neighbor voting in this instance would produce an inaccurate classification. When the training set is very large the process of isolating the nearest neighbor set can be prohibitively slow.

Support Vector Machine (SVM) classification is generally regarded as a technique that produces high-accuracy classification. In classification, a data item to be classified may be represented by a number of features. If, for example, the data item to be classified is represented by two features, it may be represented by a point in 2-dimensional space. Similarly, if the data item to be classified is represented by n features, also referred to as the "feature vector", it may be represented by a point in n-dimensional space. The training set points to be used to classify that data item are points in n+1 dimensional space (the n feature space dimensions plus the one additional class label dimension). SVM uses a kernel to translate that n+1 dimensional space to another space, usually much higher dimensional, in which the entire global boundary (or the global boundary, once a few "error" training points are removed). This linear boundary (also referred to as a hyperplane), which separates feature vector points associated with data items "in a class" and feature vector points associated with data items "not in the class." The underlying premise behind SVM is that, for any feature vector space, a higher-dimensional hyperplane exists that defines this boundary. A number of classes can be defined by defining a number of hyperplanes. The hyperplane defined by a trained SVM maximizes a distance (also referred to as an Euclidean distance) from it to the closest points (also referred to as "support vectors") "in the class" and "not in the class" so that the SVM defined by the hyperplane is robust to input noise. U.S. Pat. No. 6,327,581 to Platt, incorporated by reference herein in its entirety, describes conventional SVM techniques in greater detail. While SVM provides superior accuracy, it tends to be computationally expensive, making the method unsuitable for very large training data sets or data sets having data items with a large number of different attributes.

Conventional data mining techniques have been applied in only certain areas in which the datasets are of a small enough size or small enough dimensionality that analysis can be performed reasonably quickly and cost-efficiently using available computing technology. In other areas, however, such as bioinformatics, where analysis of microarray expression data for DNA is required, as nanotechnology where data fusion must be performed, as VLSI design, where circuits containing millions of transistors must be tested for accuracy, as spatial data, where data representative of detailed images can comprise billions of bits, as Computer Aided Detection from radiological images, where the number of features and the number of training points can both be so large that mining implicit relationships among the data can be prohibitively time consuming, even utilizing the fastest supercomputers. A need therefore exists for improved data mining techniques that provide both, high performance in terms of achieving accurate results, and computational efficiency for enabling data mining in large or high-dimensional data sets.

SUMMARY OF THE INVENTION

One aspect of the invention is directed to classifying a subject data item based on a training set of pre-classified data items. Any smooth boundary can be piecewise-linearly approximated. Therefore, if the set of near neighbors chosen is small enough the boundary (hereafter called the local boundary) between different classes will be linear. This local boundary is automatically computed. The local boundary is approximated by a neighborhood set of data items selected from the training set that have been pre-classified into different classes and have feature points similar to the points of the subject data item. A class is automatically assigned to the subject data item in accordance with a side of the local boundary on which the subject data item resides.

Embodiments of the invention include automatically processing the training set to select a neighborhood subset of data items similar to the subject data item, with the neighborhood subset including data items pre-classified into different classes. A set of multidimensional class representative points are automatically determined that each represents a corresponding class in the neighborhood subset of training points. A set of at least one multidimensional middle point representing at least one middle between at least two of the class representative points is automatically determined. For each of the at least one multidimensional middle points, a subject vector that originates at that middle point and terminates at a multidimensional point corresponding to the subject data item, and a set of representative vectors with each representative vector originating at that middle point and terminating at a corresponding class representative point, are defined.

At least one scalar operation is automatically computed between the subject vector (point) and at least one representative vector (point) of the set of representative vectors. The at least one scalar operation takes into account an angle formed by the subject vector and the at least one representative vector. For instance, the at least one operation can be an inner product. A classification of the subject data item is automatically determined based on a result of the at least one scalar operation.

Systems and methods of the invention were utilized to submit the winning entry in the KDDCup06 task 3 data mining contest, in which the technique was used to distinguish pulmonary embolisms from other radiological spots showing up on a CT scan as a set of annotated CT data, with each data item having well over 100 different attributes or features. The invention provides a variety of advantages, which will become apparent from the following disclosure.

Figure 1:
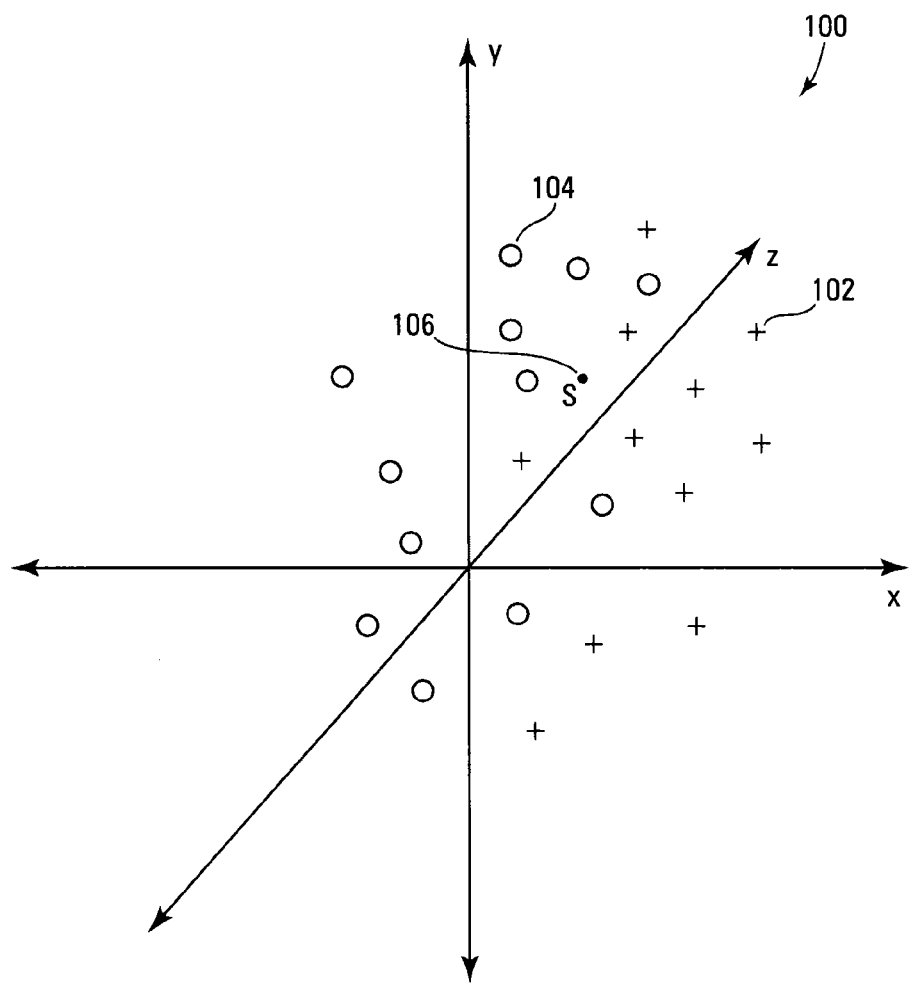
FIG. 1 is a diagram representing a data set in a feature space, each data item having three-attributes (two features represented as the horizontal and the vertical axis location respectively and a class attribute, in which there are only two classes, o and +, distinguished by the symbols o and +, along with an unclassified data item to be classified.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims and their equivalents.

DETAILED DESCRIPTION OF THE PREFERRED EMBODIMENT

According to one aspect of the invention, two variant forms of the above approaches are combined and optimized using an evolutionary algorithm to achieve great classification accuracy. An efficient vertical data structure (Predicate Tree or P-tree) and a novel nearest neighbor identification approach are used in conjunction with an evolutionary algorithm to arrive at the optimized parameters efficiently.

The approach according to one embodiment involves dealing with multiple unknown parameters, such as classification algorithm parameters, as well as attribute relevance parameters. Because of the inability to conduct exhaustive search to find the best possible combination, a Genetic Algorithm (GA) heuristic search is employed. Each iteration of the genetic algorithm requires the evaluation of the proposed classification algorithm with a suggested set of adaptive parameters. Even for small data sets, this results in a large number of training database scans to arrive at an acceptable solution. The use of a vertical data structure (P-trees) and an efficient technique (Total Variation) to identify potential close neighbors can reduce the overall total computational cost for the GA, which would otherwise be computationally prohibitive. In the following description, each component of the proposed solution and the adaptive parameters optimized by the GA are discussed.

Attribute Relevance Analysis.

In the case where the data mining training data set has a large number of attributes, conducting trials using all attributes may not be possible due to a lack of GA convergence. However, the inventor has recognized that in certain applications, such as analysis of radiology image data, current detections are done by humans. Thus, in these applications, it is likely that only a few of the many attributes are actually used. This is due to the known fact that the human mind has very limited capacity for managing multiple simultaneous contexts. In an effort to reduce the number of attributes information gain was employed with respect to class and also several vertical greedy evaluation attribute relevance and selection techniques.

P-tree Data Structure.

The input data was converted to vertical P-trees. P-trees are a lossless, compressed, and data-mining-ready vertical data structures. These data structures has been successfully applied in data mining applications ranging from Classification and Clustering with K-Nearest Neighbor, to Classification with Decision Tree Induction, to Association Rule Mining. U.S. Pat. No. 6,941,303, incorporated herein by reference, provides a detailed description of P-trees as vertical compressed data structures facilitating computationally-efficient data mining. In general, a P-tree is a data structure that compresses vertical data in a lossless format. Vertical data is data that is arranged in bit position groups, each bit position group corresponding to a different one of the of bit positions and includes bits of the data items having that bit position. The P-tree compresses the data of each bit position group such that each bit position group is represented by a compressed data structure. Ultimately, the entire data set are represented by a plurality of compressed data structures.

A basic P-tree represents one bit position of one attribute reorganized into a compressed tree structure by recursive sub-division, while recording the predicate truth value regarding purity for each division. Each level of the tree contains truth-bits that represent pure sub-trees and can then be used for fast computation of counts. This construction is continued recursively down each tree path until a pure sub-division is reached (which may or may not be at the leaf level). These basic P-trees and their complements are easily (i.e. computationally efficiently) combined using Boolean algebra operations to produce P-trees for points, entire tuples, point intervals, or any other attribute pattern or predicate. The root count of any pattern tree will indicate the occurrence count of that pattern. The P-tree data structure provides a particularly useful structure for counting patterns in an efficient manner.

Total Variation Based Potential Nearest Neighbors.

The total variation of a training data set about a given data point can be used as an index to arrive at a good set of potential neighbors. These reduced sets of candidate neighbors can be considered as functional contours (where functional means total variation about the point). Total variation is just one of many potentially useful functionals for fast pruning of non-neighbors. The total variation for each data point in a data set can be computed rapidly using vertical P-trees. For each given new subject the total variation is calculated and the data points within a total variation +/− a certain distance (epsilon) is identified as potential nearest neighbors. Subsequently the actual Euclidian distance for each subject point is calculated to find the true neighbors. This approach avoids the requirement of computing all Euclidian distances between the subject and the points in the training data, in arriving at the Nearest Neighbors.

Nearest Neighbor Classification.

Traditionally, k nearest neighbor sets are selected and a plurality vote (or weighted vote) is used to arrive at the classification of a given subject data item. In conventional K nearest neighbor classification, a specific number, K, of data items that are most similar to the reference data item are identified in the data set. This method of classification hard-limits the amount of nearest neighbors to exactly K. This means that other data items of the data set that are just as similar to the reference data item as the least similar data items of the K nearest neighbor set would be excluded from the data set, since including them would cause the nearest neighbor set to exceed K items.

Another known method of nearest neighbor classification is the so-called epsilon nearest neighbor classification. Unlike K nearest neighbor classification, epsilon nearest neighbor classification uses the degree of similarity as the criterion which defines the nearest neighbor set. In this method, all data items of a specific degree of similarity to the reference data item are included in the nearest neighbor set. Because the degree of similarity is the key criterion here, it must be specified in advance of running the classification routine. This approach can also lead to wrong classifications if the data items just beyond the nearest neighbor set are also very close to the most distant neighbor of the neighborhood set. In the traditional approaches, these k+s nearest neighbors would be excluded from the neighborhood.

In one embodiment, closed K nearest neighbor classification is utilized, in which the number and the similarity does not need to be known a priori. Instead, this method of classification defines the nearest neighbor set as all data items having a degree of similarity to the referenced data item as any $K^{th}$ most similar data item that would be produced by the conventional K nearest neighbor algorithm.

Conventionally, one can first run a traditional K nearest neighbor algorithm, determine the degree of similarity of a $K^{th}$ most similar data item, and then run an epsilon nearest neighbor algorithm using that degree of similarity found by running the K nearest neighbor algorithm as the degree of similarity input. This, of course, requires running two, rather than one, classification algorithm. In contrast, this embodiment achieves the closed nearest neighbor set with a single pass through the classification algorithm. Moreover, using the vertical data arrangement methods including compressed vertical data structures (e.g., P-trees) the classification can be preformed with simple logical operations directly on compressed data structures. This provides a scalable solution in which the computer processing time is not significantly longer for larger data sets.

In one embodiment, all neighbors within a certain given Euclidian distance (the "closed k or epsilon nearest neighbor set) are used. Attribute-weighted Euclidian distances are used. Additionally, a Gaussian weighting of the vote is applied based on distance to the subject. The contribution to each class vote from '$X^{th}$' epsilon neighbor in class 'c' for subject 's' is calculated as follows.

$$Vote_c = e^{-(sigma^2 d(x_c,s)^2)} \times \frac{TotalSamples}{Count(Class = c)} \times VoteFact_c \quad (1)$$

In equation (1) above, d(x,s) indicates the weighted Euclidian distance from subject s to neighbor x. The parameters 'VoteFact', 'sigma' and the epsilon can be optimized by evolutionary algorithms.

Boundary Based Classification.

In contrast to the traditional approach (e.g., Support Vector Machines) of finding a hyper plane that separates the two classes for the entire data set (albeit, likely in a much higher dimension translate), one aspect of the invention is directed to finding the direction of the subject with respect to a local boundary segment between the two classes for a given subject's nearest neighborhoods only. FIG. 1 is a diagram illustrating a portion 100 of a data set having data items in two classes, class + and class O. For example, data item 102 is in the + class; whereas data item 104 is in the O class. The feature space in this example has three dimensions, x, y, and z, as illustrated. In practice, a feature space can have many more dimensions; however, for the sake of simplicity, only three dimensions are illustrated in this example. Subject S, which is a data item to be classified, is indicated at 106. In one example, the data set represents annotated CT scan data in which different features of a CT image are identified and characterized by a number of attributes, such as position, size, intensity, shape parameters, halo geometry parameters, and the like. In the KDDCup06 task 3 data set, there were around 116 total attributes for each data item representing an annotated feature of the CT image.

Figure 2:
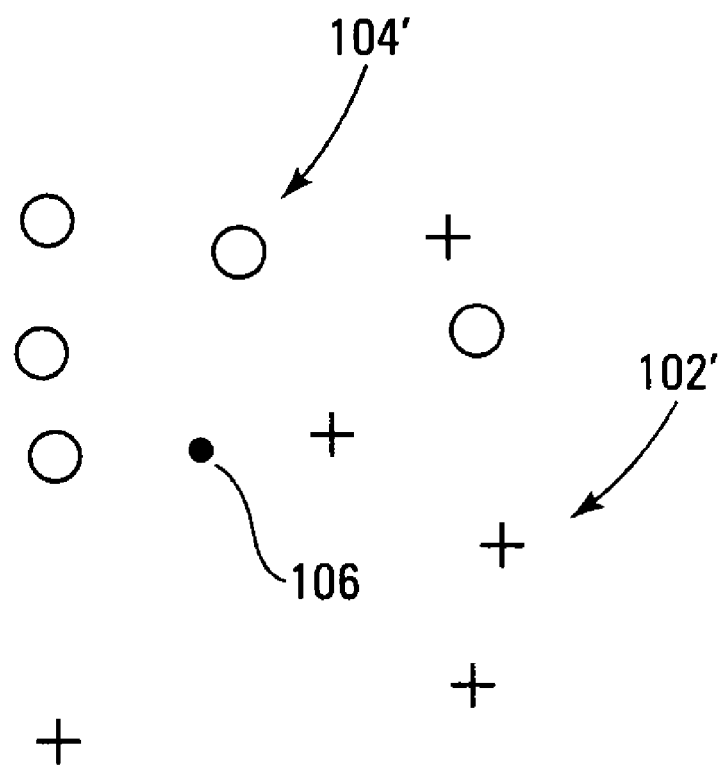
FIG. 2 is a diagram illustrating a subset of data items selected as a neighborhood for the item to be classified according to one embodiment of the invention.

In one embodiment, the same epsilon nearest neighbors identified in the Nearest Neighbor voting step are used to compute the local boundary between the classes. FIG. 2 illustrates the nearest neighbors of the portion 100 of the data set of FIG. 1. The nearest neighbors in this example include data points classified in class +, indicated at 102'; and data points classified in class O, indicated at 104'. The rationale behind the use of nearest neighbors of the subject point 106 to be classified to determine the boundary between the classes is the underlying premise that all smooth boundaries can be approximated to any level of accuracy by a piecewise linear boundary.

Figure 3A:
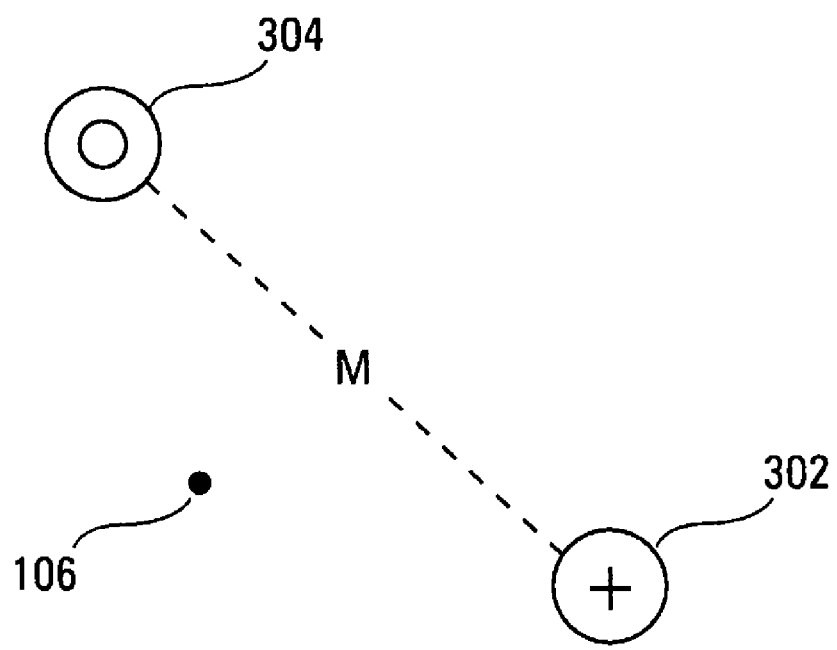
FIG. 3A is a diagram illustrating selection of representative points for each class of neighbors (not necessarily coincident with training points), and selecting a middle point between these representative points according to one embodiment of the invention.

The classes are each reduced to a representative point in the feature space, as illustrated in FIG. 3A. Data items 102' of class + are represented by representative point 302; and data items 104' of class O are represented by representative point 304. In one embodiment, representative points 302 or 304 are each based on a statistical combination of the points of data items 102' and 104', respectively. For instance, the statistical combination can be an average point, a vector median point, or a most frequently-occurring point. A point that is either present, or not present, among each of the data items may be used. Any suitable technique of selecting a representative point may be employed within the spirit and scope of this aspect of the invention.

Figure 3B:
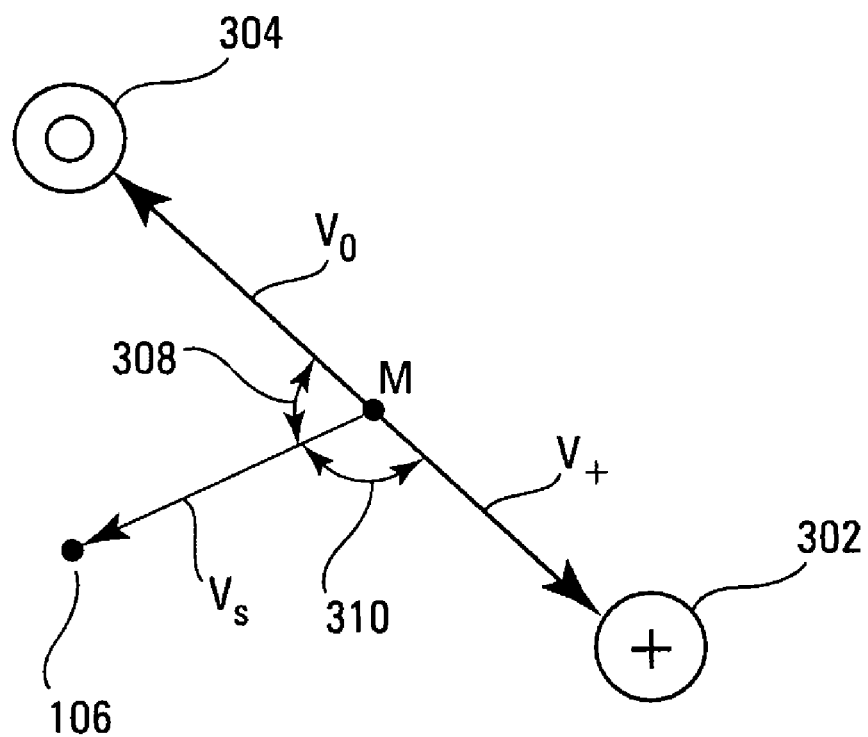
FIG. 3B is a diagram illustrating constructed vectors originating at the middle point and terminating at each of the representative points and at the data item to be classified according to one embodiment of the invention.

A middle point M is selected between each of the class representatives 302 and 304, as illustrated in FIG. 3B. Middle point M can be a spatial midpoint or any centroid, mean point, vector of medians, or any suitable choice (not necessarily a training point itself). Middle point M is used as an origin for constructing vectors to each representative point and to the subject data item. Thus, subject vector $V_s$ originating at middle point M and terminating at subject data item 106 is defined. Likewise, representative vectors $V_+$ and $V_O$ are defined respectively for representative points 302 and 304.

A scalar operation is then computed between subject vector $V_s$ and each of the representative vectors $V_+$ and $V_O$ that takes into account the angle formed therebetween. For instance, in FIG. 3B, a first scalar operation is performed between subject vector $V_s$ and representative vector $V_O$ that takes into account angle 308; and a second scalar operation is performed between subject vector $V_s$ and representative vector $V_+$ that takes into account the angle 310. An example of such a scalar operation is an inner product, or vector dot product. The result of taking the inner product is a point that is either positive, negative, or zero. A positive result indicates that the angle is acute, implying that the subject point 106 is on the corresponding side of the piecewise-linear approximated boundary between the two classes.

The basic intuition for the above classification decision is, if the class is positive the inner product will be positive. Rather than using 0 as the ultimate decision threshold this approach enables increasing the confidence of the positive or negative prediction by using a nonzero threshold. This is useful in a situation where a certain type of class identification is valued more than the other class and when there may be a high level of noise. The final classification threshold value is also a parameter that can be optimized by the GA in one embodiment. In a related embodiment, the identification of the local median for a given class can be readily identified using the vertical data structure P-tree.

Figure 4:
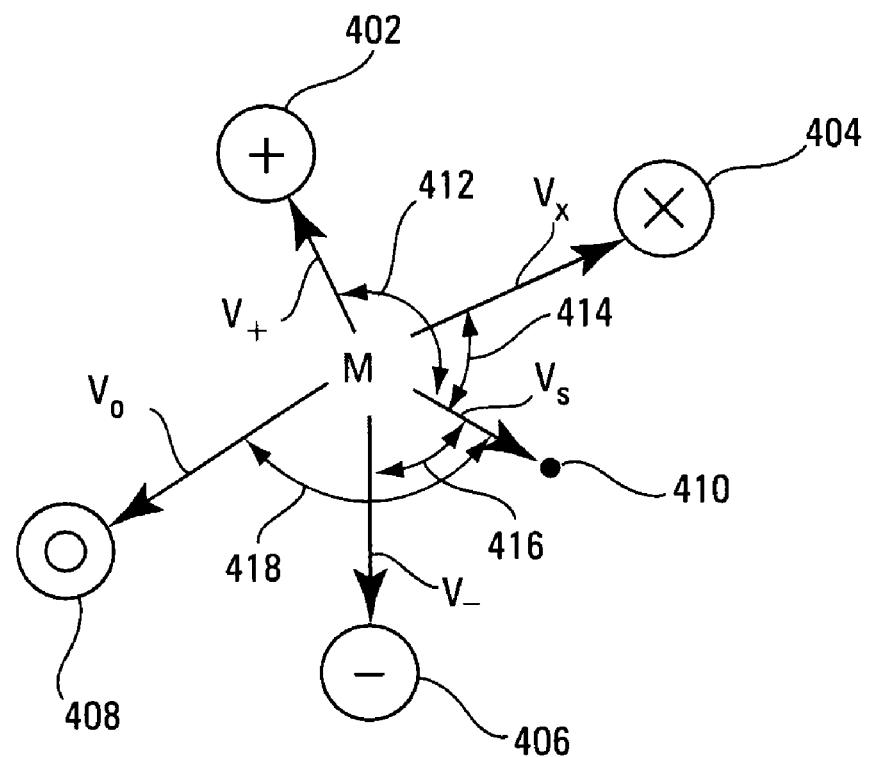
FIG. 4 is a diagram illustrating an exemplary application of aspects of the invention to classify a data item into a class from among more than two classes (o, + and − classes, in this diagram).

FIG. 4 is a diagram illustrating a technique for classifying a subject data item among more than two classes. Representative points 402, 404, 406, and 408 respectively represent nearest neighbors of the corresponding classes. A single middle point M is determined based on some suitable combination or aggregation of the representative points, such as mean, median, center of gravity, and the like. Representative vectors $V_+$, $V_X$, $V_-$, and $V_O$ are defined originating from middle point M, and subject vector $V_S$ is defined from middle point M to subject data item 410 to be classified. The scalar operation, such as inner product, is computed in turn between each representative vector and the subject vector $V_S$. In one embodiment, the class corresponding to the largest point produced by the inner product computation is the classification for subject data item 410. In another embodiment, the class associated with the most acute angle among the angles 412, 416, 418, and 420, is the proper classification for data item 410.

Figure 5A:
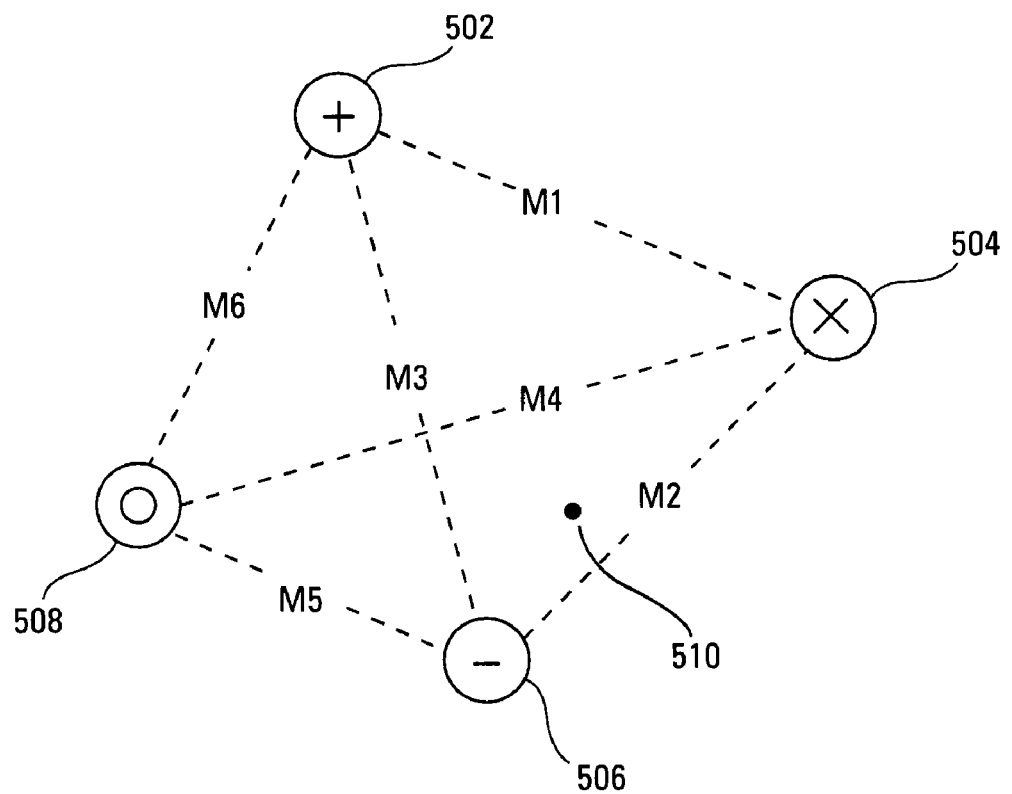
FIGS. 5A-5B and 6A-6B are diagrams illustrating various exemplary applications of aspects of the invention to classify a data item into a class from among more than two classes.
Figure 5B:
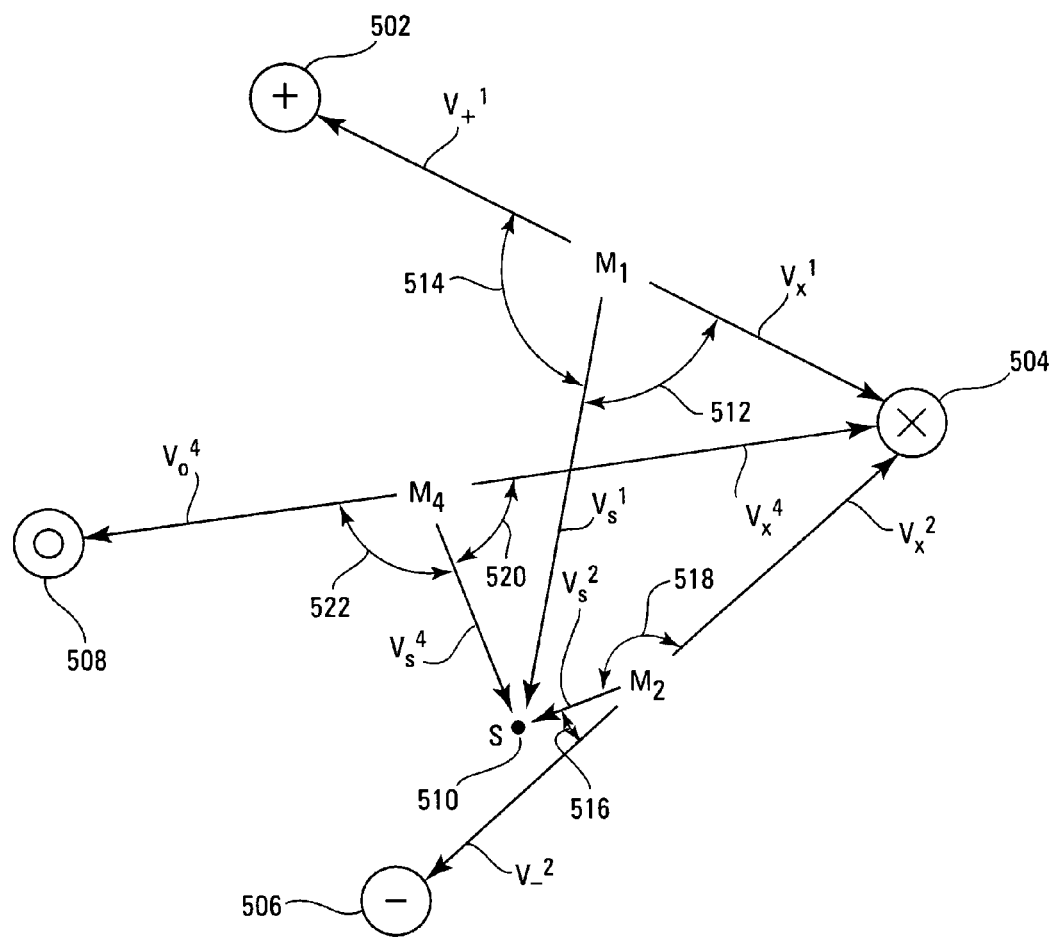

FIGS. 5A-5B illustrate another example embodiment of the invention for classifying a data item among more than two classes. In this embodiment, a plurality of middle points $M_1$-$M_6$ are defined between each pair of class representative points 502, 504, 506, and 508, as illustrated. For each middle point, a pair of representative vectors to the opposite representative points are defined, along with a subject vector to subject data item 510 to be classified. A portion of this procedure is illustrated in FIG. 5B. Middle point $M_1$ is defined between representative points 502 and 504. Representative vectors $V_+^1$ and $V_X^1$, and subject vector $V_S^1$ are defined. The inner products are computed based on angles 512 and 514. This produces a result that represents a preference for classifying data item 510 between class + and class X.

The process is repeated for each of the midpoint points. For instance, for midpoint point M2, representative vectors $V_-^2$ and $V_X^2$, and subject vector $V_S^2$ are defined. The inner products are computed based on angles 516 and 518. Likewise, for midpoint point M4, representative vectors $V_O^4$ and $V_X^4$, and subject vector $V_S^4$ are defined. The inner products are computed based on angles 520 and 522. In one embodiment, only those inner products for the vectors originating at midpoint points that are based on a preferred classification are computed. Thus, in the present example, beginning with midpoint point M1, a preference for class X is determined. Thus, only midpoint points M4 and M2 need to be examined at the next recursion since these are the midpoint points that are based on a preferred classification. Computing the inner products associated with midpoint point M4 reveals a continuing preference for class X. Continuing the process, the inner products associated with midpoint M2, however, reveals a preference for classification to class−. This would require computing the inner products associated with the vectors originating from midpoints M5 and M3. Eventually, this process reveals a most preferred classification.

Figure 6A:
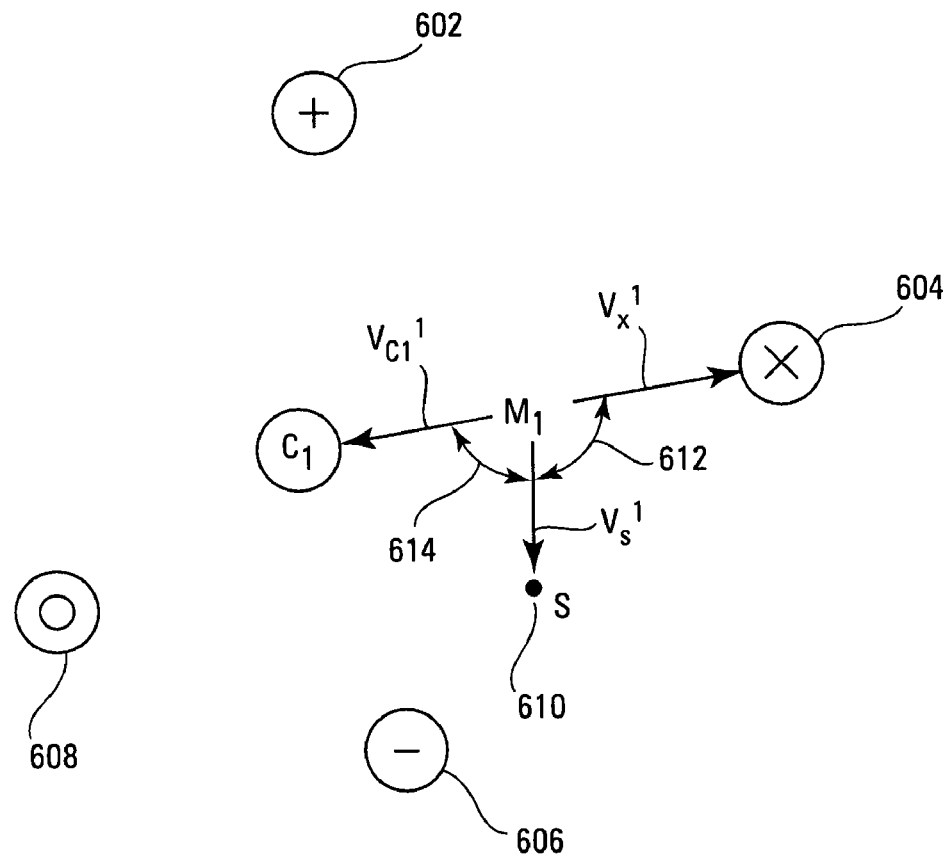
Figure 6B:
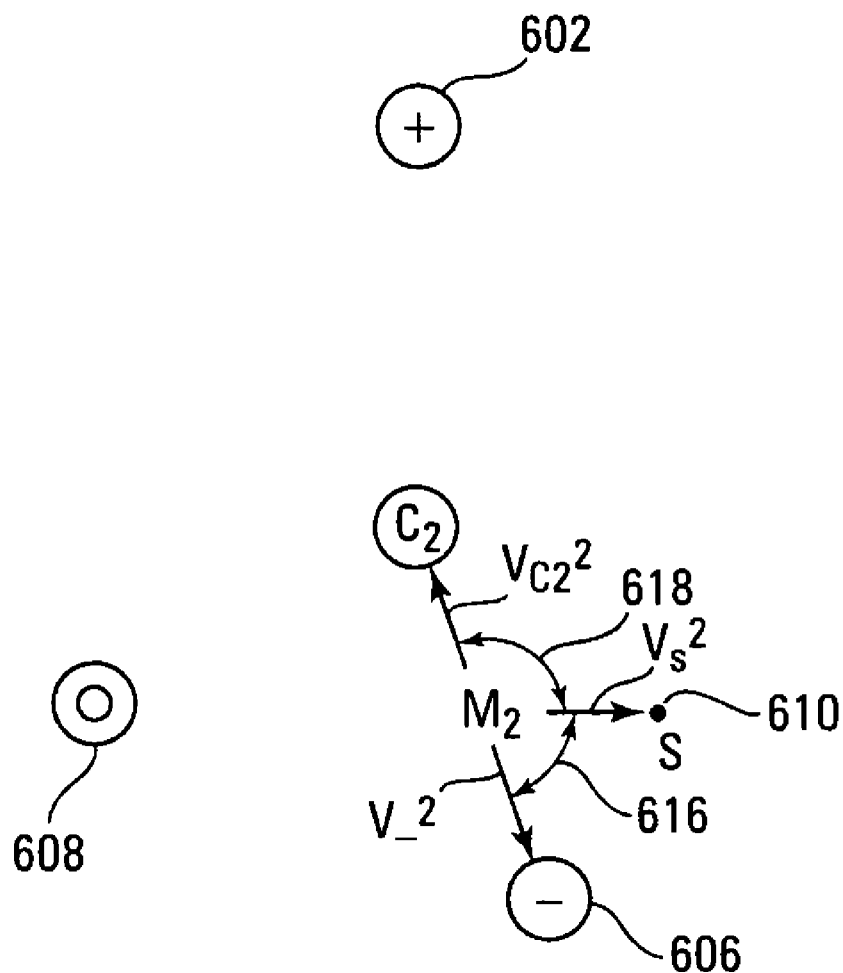

FIGS. 6A and 6B illustrate another approach for classifying a subject data item 610 among more than two classes. A first representative point is selected, such as representative point 604 corresponding to class X. Among the remaining representative points 602, 608, and 606, a representative center point $C_1$ is determined. Representative center point $C_1$ can be determined by any suitable combination such as average, median, centroid, center of gravity, and the like. Middle point M1 is defined between representative center point $C_1$ and representative point 604. Representative vectors $V_{C1}^1$ and $V_X^1$, and subject vector $V_S^1$ are defined, and the inner product or other suitable scalar operation is computed based on angles 612 and 614. If the classification preference is to class X, the process is completed. Otherwise, the process is continued in recursive fashion by eliminating class X, and determining classification preference between a next selected representative point from among representative points 602, 606, and 608, and a new representative center point C2 based on the non-selected representative points, as illustrated in FIG. 6B. In this example, a new middle point M2 is defined between representative point 606 and representative center point $C_2$. Representative vectors $V_{C2}^2$ and $V_X^2$, and subject vector $V_S^2$ are defined, and the inner product or other suitable scalar operation is computed based on 616 and 618. The process is concluded when a representative point (rather than a center point based on a plurality of representative points) is associated with a most acute angle.

In another embodiment, as a variant of the process described above with respect to FIGS. 6A and 6B, a single common center point based on all representative points is selected, and middle points are defined, in turn, between the common center point and each representative point. For each of these middle points, the representative vectors subject vector are defined, and the inner products are computed. The largest inner product or the most acute angle determines the proper classification. Persons of ordinary skill in the art will appreciate that other computationally efficient techniques for determining a classification among more than two different classes may be used within the spirit and scope of the invention.

Final Classification Rule.

The final classification rule is based on the combined classification of the Nearest Neighbor approach and the boundary-based approach based on the specific task. For example, in one embodiment, the following rule was used to produce a winning data mining contest entry in the KDDCup06 task 3 to analyze radiological data to detect a pulmonary embolism.

```
If ( NNClass=0 ) AND ( BoundryBasedClass=0 )
    class=0
else
    class=1.
```

Genetic Algorithm-based Parameter Optimization.

As described above, the approach has multiple parameters that may be optimized to arrive at the best possible classification. An important aspect of any evolutionary algorithm is the evaluation function. The evaluation function should guide the GA towards a near-optimal solution. Evaluation functions were based on the specific task criterion. For example, in one embodiment, the following simple evaluation function was used.

```
If ( NPV > 0.49 )
    SolutionFitness=NPV+TN
else
    SolutionFitness=NPV
```

Negative prediction value (NPV) and total negative (TN) were calculated based on the task specification for KDDCup06. The above fitness function encourages solutions with high valued TN provided that NPV is within the threshold value. Although the task specified threshold was 1.0, with a very low number of negative cases it was too much to expect multiple solutions that meet the actual NPV threshold and also maintain a high TN level. In a GA, collection of quality solutions in each generation potentially influences the set of solutions in the next generation.

Table 1 below describes some of the optimized parameters for task 3

TABLE 1

| Parameter | Value | Range |
| --- | --- | --- |
| Epsilon | 0.5 | 0.1 to 3.2 |
| VoteFactor$_c$ | $1.0_0$, $0.75_1$ | 0.0 to 2.0 |
| Inner Product Threshold | 0.23 | −0.6 to 0.27 |

Figure 7:
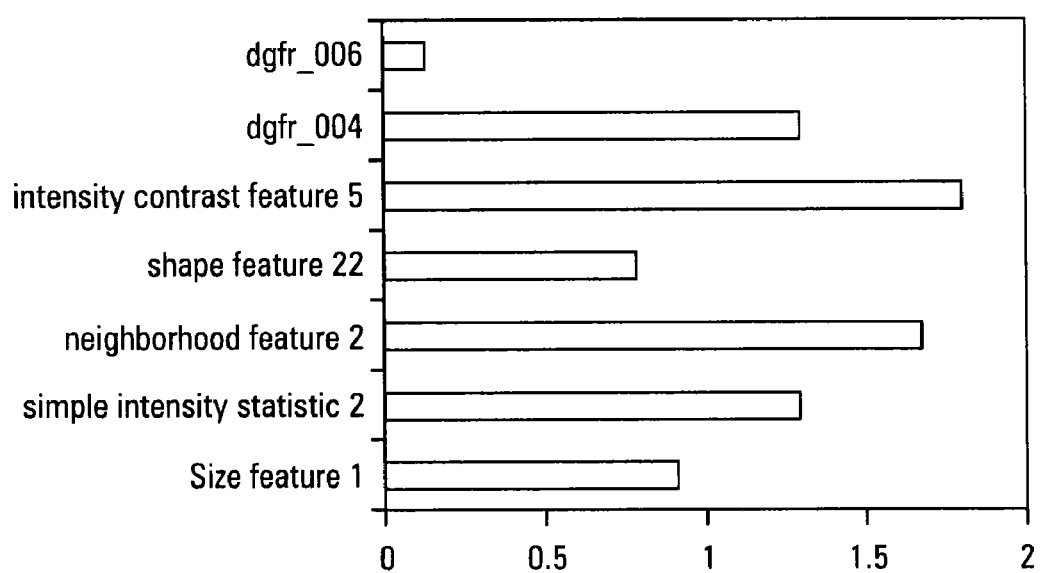
FIG. 7 is a graph illustrating optimized weights for the selected attributes for task 3 of the KDD Cup06 competition.

FIG. 7 is a graph illustrating optimized weights for the selected attributes for task 3 of the KDD Cup06 competition.

Figure 8:
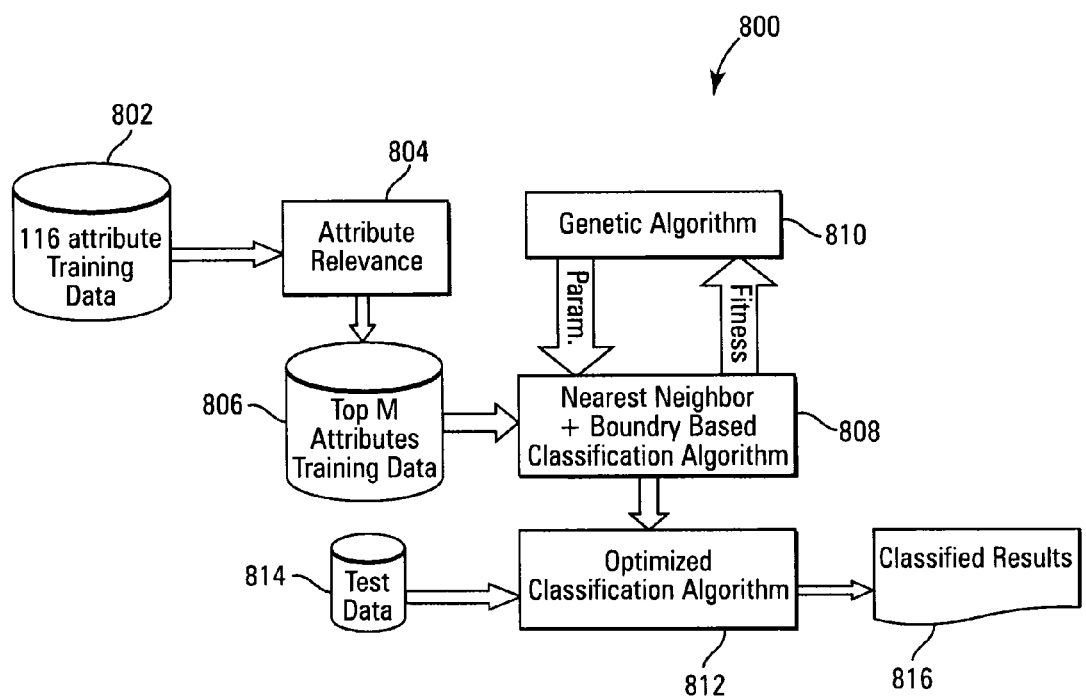
FIG. 8 is a functional flow diagram summarizing an example of a system according to one embodiment of the invention and the interoperability of its components.

In cases where the training data set was small, patient level bootstrapping can be used to validate the solutions to identify the optimum values for the respective parameters. The final optimized classifier is used to classify unknown subjects. FIG. 8 is a functional flow diagram summarizing an example of a system 800 and the interoperability of its components. Training data 802, such as the 116-attribute training set provided in the KDDCup06 task 3. The attributes are pruned for relevance at 804, producing a training data set 806 having the top M attributes determined to be the most relevant. This operation can be performed automatically using known heuristic methods in one embodiment; or manually using a multiple iterative process.

At 808 and 810, a classification algorithm is developed based on training data 806. The development of the classification algorithm includes parameter optimization using a genetic algorithm. At 812, the optimized classification algorithm is applied to the test data 814 to be classified to produce classified results at 816.

Figure 9:
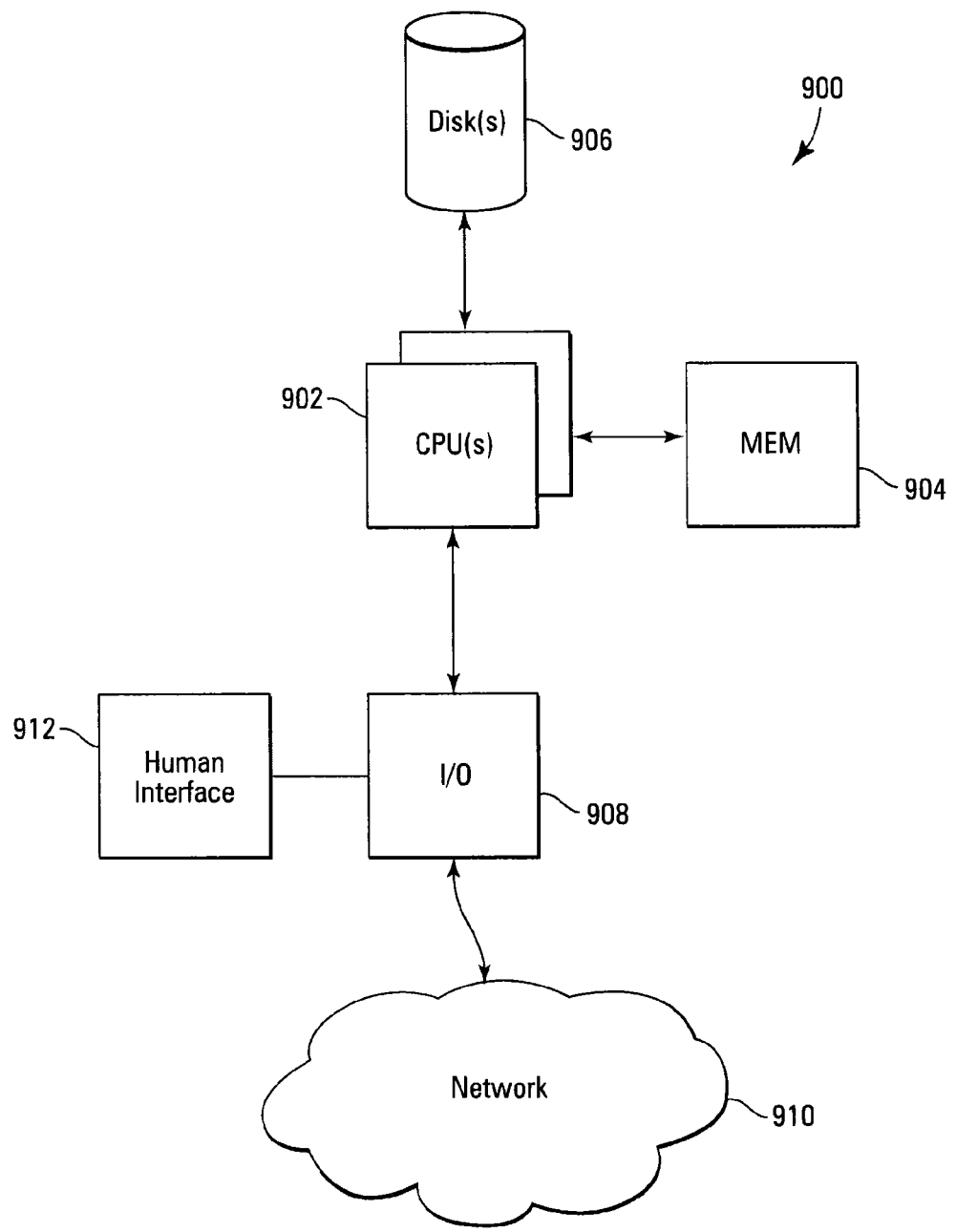
FIG. 9 is a block diagram illustrating an example of computer system according to one embodiment of the invention.

FIG. 9 is a block diagram illustrating an example of computer system 900 that can implement embodiments of the present invention. Computer system 900 includes processor 902 coupled to memory 904 and having instructions stored thereon to execute an algorithm as described herein. Memory 904 can also store at least a portion of the training data set and of the set of data having at least one data item to be classified. The processor 902 can be distributed across multiple locations. Persons skilled in the art will readily appreciate that processor 902 can be embodied by any suitable processor including, without limitation, a RISC or CISC microprocessor, a microcontroller, a microcomputer, a FPGA, an ASIC, an analog processor circuit, a quantum computer, or a biological processor, for example, and can include single or multiple processing units. The processor can also be of a type that operates in batch mode or real-time mode.

Disk(s) 906 are interfaced with processor 902 and store the training data set, the data to be classified, and instructions that cause system 900 to implement embodiments of the present invention. Input/output (I/O) module 908 is interfaced with processor 902 and network 910, such as the Internet or a local network. I/O module 908 can also interface with human interface peripherals, such as a keyboard, mouse, monitor, printer, scanner, and the like.

Computer system 900 can be provided with instructions for carrying out the various methods of the invention, the training data set needed to classify an unclassified data item, and the unclassified data item to be classified, and can output the classification for the data item to be classified.

Figure 10A:
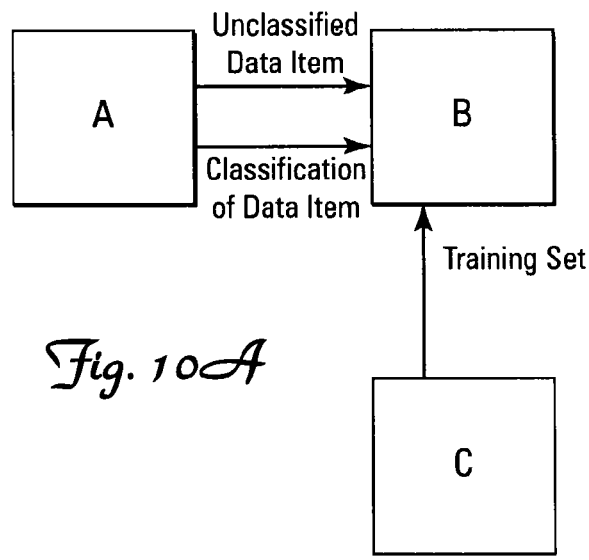
FIGS. 10A and 10B are block diagrams illustrating various configurations of remote computers for implementing aspects of the invention.
Figure 10B:
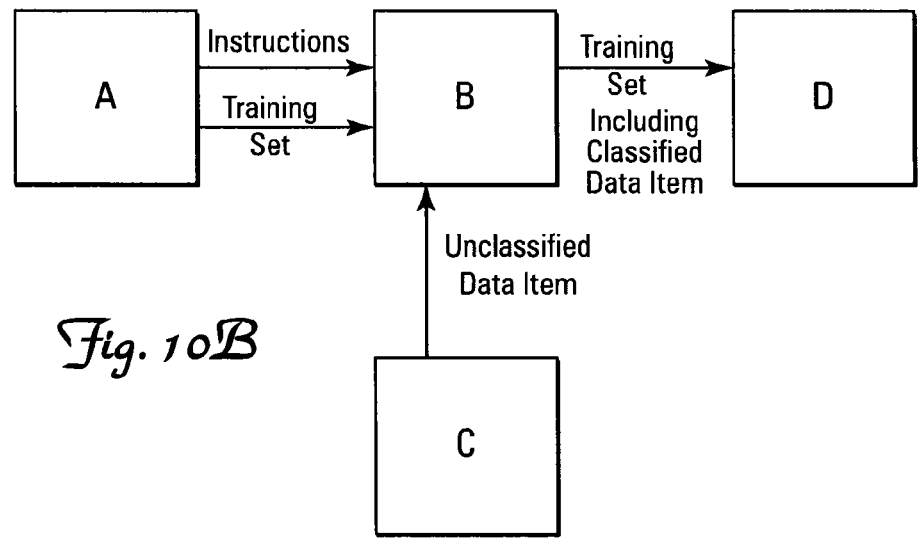

FIGS. 10A and 10B are diagrams illustrating various other configurations of computer systems that implement aspects of the present invention. In FIG. 10A, a first computer system indicated at A transmits an unclassified data item to be classified to a remote computer system B. Computer system C, remote from both systems A and B provides the training set. Computer system B is programmed with the instructions for performing the classification, and performs the classification. Performing the classification can be done locally at computer system B, or can be distributed over multiple remote computer systems. Computer system B communicates the classification result to computer system A.

In FIG. 10B, computer system A provides the instructions and training data set to computer system B. The item to be classified is provided by computer system C. Computer system B performs the classification, and outputs a complete training set that includes the now-classified data item to remote computer system D. Persons of ordinary skill in the relevant arts will understand that any variety of configurations of different computer systems can be utilized to accomplish the classification within the spirit and scope of the present invention.

While the system and methods in the examples described herein have been geared for solving a classification problem in the medical imaging field, it should be understood that these approaches are readily adaptable to other classification problems, whether or not the training features are numeric in nature. More generally, the present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An apparatus for classifying a subject data item based on a training set of pre-classified data items into a plurality of classes, wherein the subject data item and the pre-classified data items are multidimensional data items, wherein at least one dimension of the multidimensional data items represents a value having a unit of measure, the apparatus comprising:
a computer system including a processor and data storage containing the subject data item and the training set, wherein the computer system is programmed to:
process the training set to select a neighborhood subset of data items similar to the subject data item, wherein the neighborhood subset includes data items pre-classified into different classes;
determine a set of multidimensional class representative points that each represents a corresponding class of the neighborhood subset of data items;
determine a set of at least one multidimensional middle point representing at least one middle between at least two of the class representative points;
for each of the at least one multidimensional middle points:
define a subject vector that originates at that middle point and terminates at a multidimensional point corresponding to the subject data item; and
define a set of representative vectors such that each representative vector originates at that middle point and terminates at a corresponding one of the set of multidimensional class representative points;
compute at least one scalar operation between the subject vector and at least one representative vector of the set of representative vectors, wherein the at least one scalar operation takes into account an angle formed by the subject vector and the at least one representative vector; and
determine a classification of the subject data item based on a result of the at least one scalar operation that takes into account the angle formed by the subject vector and the at least one representative vector, such that a result of the classification includes an association of the subject data item with at least one class of the plurality of classes.

2. The apparatus of claim 1, wherein the neighborhood subset of data items similar to the subject data item includes a nearest neighbor set of data items that have at least a predetermined degree of similarity to the subject data item.

3. The apparatus of claim 2, wherein the nearest neighbor set is a closed nearest neighbor set consisting of all of the data items having a degree of similarity to the subject data item that is equal to or greater than a degree of similarity of an $n^{th}$ most similar data item, wherein n is predetermined.

4. The apparatus of claim 2, wherein each of the training set data items has a plurality of bits, each bit in a corresponding one of a plurality of bit positions; and wherein the computer system is programmed to:
arrange the training set in the data storage such that the training set data items are in bit position groups, wherein each bit position group corresponds to a different one of the plurality of bit positions and includes bits of the training set data items having that bit position;
compress the data of each bit position group such that each bit position group is represented by a compressed data structure, wherein the training set data items are represented by a plurality of compressed data structures; and
determine the neighborhood subset of data items by processing the plurality of compressed data structures.

5. The apparatus of claim 1, wherein the multidimensional class representative points are each determined based on a statistical combination of points of the data items of the corresponding class within the neighborhood subset.

6. The apparatus of claim 5, wherein the statistical combination is of at least one type selected from the group consisting of: a mean, a median, a mode and a distribution function.

7. The apparatus of claim 1, wherein the at least one multidimensional middle point is a single multidimensional middle point that represents a middle between all of the class representative points.

8. The apparatus of claim 1, wherein the at least one multidimensional middle point is a plurality of multidimensional middle points that each represents a middle between different subsets of the class representative points.

9. The apparatus of claim 1, wherein the at least one multidimensional middle point is computed based on at least one type of middle point selected from the group consisting of: a midpoint point, a mean point, a vector median points, a centroid point, and a center of gravity.

10. The apparatus of claim 1, wherein the at least one scalar operation between the subject vector and at least one representative vector includes an inner product computation.

11. The apparatus of claim 1, wherein the at least one scalar operation includes:
- a first scalar operation between a first subject vector originating from a first middle point and a first representative vector originating from the first middle point; and
- a second scalar operation between a second subject vector originating from a second middle point and a second representative vector originating from the second middle point.

12. The apparatus of claim 1, wherein the classification is determined based on an attribute of the angle, wherein the computer system is programmed to classify the subject data item according to the class to which a representative vector corresponds that is associated with a smallest angle among angles that are smaller than 90 degrees produced by the at least one scalar operation.

13. The apparatus of claim 1, wherein the subject data item includes data of a type selected from the group consisting of: bioinformatics data, electronics design data, image data, and medical data.

14. A method for improving computational efficiency of an apparatus for classifying a subject data item based on a training set of pre-classified data items into a plurality of classes, wherein the subject data item and the pre-classified data items are multidimensional data items, wherein at least one dimension of the multidimensional data items represents a value having a unit of measure, the method comprising:
- causing the apparatus to automatically process the training set to select a neighborhood subset of data items similar to the subject data item, wherein the neighborhood subset includes data items pre-classified into different classes;
- causing the apparatus to automatically determine a set of multidimensional class representative points that each represents a corresponding class of the neighborhood subset of data items;
- causing the apparatus to automatically determine a set of at least one multidimensional middle point representing at least one middle between at least two of the class representative points;
- for each of the at least one multidimensional middle point:
  - causing the apparatus to automatically define a subject vector that originates at that middle point or point and terminates at a multidimensional point or point corresponding to the subject data item; and
  - automatically define a set of representative vectors such that each
- representative vector originates at that middle point and terminates at a
- corresponding class representative point;
- causing the apparatus to automatically compute at least one scalar operation between the subject vector and at least one representative vector of the set of representative vectors, wherein the at least one scalar operation takes into account an angle formed by the subject vector and the at least one representative vector; and
- causing the apparatus to automatically determine a classification of the subject data item based on a result of the at least one scalar operation that takes into account the angle formed by the subject vector and the at least one representative vector, such that a result of the classification includes an association of the subject data item with at least one class of the plurality of classes.

15. The method of claim 14, wherein causing the apparatus to automatically process the training set to select a neighborhood subset of data items includes determining a nearest neighbor set of data items that have at least a predetermined degree of similarity to the subject data item.

16. The method of claim 15, wherein causing the apparatus to determine the nearest neighbor set includes determining a closed nearest neighbor set consisting of all of the data items having a degree of similarity to the subject data item that is equal to or greater than a degree of similarity of an $n^{th}$ most similar data item, wherein n is predetermined.

17. The method of claim 15, wherein each of the training set data items has a plurality of bits, each bit in a corresponding one of a plurality of bit positions; and
wherein the method further comprises:
- automatically arranging the training set such that the training set data items are in bit position groups, wherein each bit position group corresponds to a different one of the plurality of bit positions and includes bits of the training set data items having that bit position;
- automatically compressing the data of each bit position group such that each bit position group is represented by a compressed data structure, wherein the training set data items are represented by a plurality of compressed data structures; and
- automatically determining the neighborhood subset of data items by processing the plurality of compressed data structures.

18. The method of claim 14, wherein causing the apparatus to automatically determine the multidimensional class representative points includes computing a statistical combination of points or points of the data items of the corresponding class within the neighborhood subset.

19. The method of claim 14, wherein causing the apparatus to automatically determine the set of at least one multidimensional middle point includes producing a single multidimensional middle point that represents a middle between all of the class representative points.

20. The method of claim 14, wherein causing the apparatus to automatically determine the set of at least one multidimensional middle includes producing a plurality of multidimensional middle point that each represents a middle between different subsets of the class representative points.

21. The method of claim 14, wherein causing the apparatus to automatically compute the at least one scalar operation includes causing the apparatus to compute an inner product of the subject vector and the at least one representative vector.

22. The method of claim 14, wherein causing the apparatus to automatically compute the at least one scalar operation includes:
- computing a first scalar operation between a first subject vector originating from a first middle point and a first representative vector originating from the first middle point; and
- computing a second scalar operation between a second subject vector originating from a second middle point and a second representative vector originating from the second middle point.

23. The method of claim 14, wherein causing the apparatus to automatically determine the classification of the subject data item is based on an attribute of the angle, wherein the subject data item is classified according to the class to which a representative vector corresponds that is associated with a smallest angle among angles that are smaller than 90 degrees produced by the at least one scalar operation.

24. The method of claim 14, wherein the subject data item includes data of a type selected from the group consisting of: bioinformatics data, electronics design data, image data, and medical data.

25. A method for facilitating remote computerized classifying of a subject data item based on a training set of pre-classified data items into a plurality of classes, wherein the subject data item and the pre-classified data items are multi-dimensional data items, wherein at least one dimension of the multidimensional data items represents a value having a unit of measure, the method comprising:

transmitting, from a local computer system to a remote computer system, at least one of the training set and the subject data item to be classified according to a process in which:

the training set is automatically processed to select a neighborhood subset of data items similar to the subject data item, wherein the neighborhood subset includes data items pre-classified into different classes;

a set of multidimensional class representative points is automatically determined such that that each represents a corresponding class of the neighborhood subset of data items;

a set of at least one multidimensional middle point representing at least one middle between at least two of the class representative points is automatically determined;

for each of the at least one multidimensional middle point:

a subject vector that originates at that middle point and terminates at a multidimensional point corresponding to the subject data item is automatically defined; and a set of representative vectors, wherein each originates at that middle point and terminates at a corresponding class representative point is automatically defined; and at least one scalar operation is automatically computed between the subject vector and at least one representative vector of the set of representative vectors, wherein the at least one scalar operation takes into account an angle formed by the subject vector and the at least one representative vector;

wherein the process facilitates automatically determining a classification of the subject data item based on a result of the at least one scalar operation that takes into account the angle formed by the subject vector and the at least one representative vector, such that a result of the classification includes an association of the subject data item with at least one class of the plurality of classes.

26. The method of claim 25, wherein the subject data item includes data of a type selected from the group consisting of: bioinformatics data, electronics design data, image data, and medical data.

27. A method for obtaining a classification of a subject data item based on a training set of pre-classified data items into a plurality of classes, wherein the subject data item and the pre-classified data items are multidimensional data items, wherein at least one dimension of the multidimensional data items represents a value having a unit of measure, the method comprising:

receiving, by a local computer system from a remote computer system, a newly-classified data item classified based on a result of at least one scalar operation computed by a process in which:

the training set is automatically processed to select a neighborhood subset of data items similar to the subject data item, wherein the neighborhood subset includes data items pre-classified into different classes;

a set of multidimensional class representative points is automatically determined such that that each represents a corresponding class of the neighborhood subset of data items;

a set of at least one multidimensional middle point representing at least one middle between at least two of the class representative points is automatically determined;

for each of the at least one multidimensional middle point:

a subject vector that originates at that middle point and terminates at a multidimensional point corresponding to the subject data item is automatically defined; and a set of representative vectors, wherein each originates at that middle point and terminates at a corresponding class representative point is automatically defined; and the at least one scalar operation is automatically computed between the subject vector and at least one representative vector of the set of representative vectors, wherein the at least one scalar operation takes into account an angle formed by the subject vector and the at least one representative vector, such that a result of the classification includes an association of the subject data item with at least one class of the plurality of classes.

28. The method of claim 27, wherein the subject data item includes data of a type selected from the group consisting of: bioinformatics data, electronics design data, image data, and medical data.

29. A computer-readable medium for classifying a subject data item based on a training set of pre-classified data items, comprising instructions to cause a computer system to execute a process in which:

the training set is automatically processed by the computer system to select a neighborhood subset of data items similar to the subject data item, wherein the neighborhood subset includes data items pre-classified into different classes;

a set of multidimensional class representative points is automatically determined by the computer system such that that each represents a corresponding class of the neighborhood subset of data items;

a set of at least one multidimensional middle point representing at least one middle between at least two of the class representative points is automatically determined by the computer system;

for each of the at least one multidimensional middle point:

a subject vector that originates at that middle point and terminates at a multidimensional point corresponding to the subject data item is automatically defined by the computer system; and a set of representative vectors, wherein each originates at that middle point and terminates at a corresponding class representative point is automatically defined by the computer system; and at least one scalar operation is automatically computed by the computer system between the subject vector and at least one representative vector of the set of representative vectors, wherein the at least one scalar operation takes into account an angle formed by the subject vector and the at least one representative vector;

wherein the process to be executed by the computer system facilitates automatically determining a classification of the subject data item based on a result of the at least one scalar operation that takes into account the angle formed by the subject vector and the at least one representative vector, such that a result of the classification includes an association of the subject data item with at least one class of the plurality of classes.

30. The computer-readable medium of claim 29, wherein the subject data item includes data of a type selected from the group consisting of: bioinformatics data, electronics design data, image data, and medical data.

* * * * *